(12) United States Patent
Fujimura et al.

(10) Patent No.: US 6,661,535 B1
(45) Date of Patent: Dec. 9, 2003

(54) MOIRE FRINGE ELIMINATING APPARATUS AND A METHOD FOR ELIMINATING MOIRE FRINGES

(75) Inventors: Koichi Fujimura, Yokohama (JP); Shouichi Kuboyama, Kawasaki (JP); Nobuyuki Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/459,887

(22) Filed: Dec. 14, 1999

(30) Foreign Application Priority Data

Dec. 15, 1998 (JP) .............................. 10-355536

(51) Int. Cl.[7] ..................... H04N 1/405; H04N 1/409
(52) U.S. Cl. .................. 358/3.02; 358/3.11; 358/3.26
(58) Field of Search ..................... 358/1.9, 3.02, 358/3.06, 3.09, 3.11, 3.12, 3.26, 533, 534; 382/275, 195

(56) References Cited

U.S. PATENT DOCUMENTS 4,903,123 A * 2/1990 Kawamura et al. ........ 358/3.26
5,798,846 A * 8/1998 Tretter ........................ 358/533

* cited by examiner

*Primary Examiner*—Scott Rogers
(74) *Attorney, Agent, or Firm*—Staas & Halsey LLP

(57) ABSTRACT

In a moire fringes eliminating apparatus, a moire fringe eliminating unit comprises a halftone dot feature extracting unit, a re-calculation unit, a re-calculation deciding unit, and a halftone dot shape changing unit. The halftone dot feature extracting unit extracts features of the halftone dots. The re-calculation unit obtains a re-calculation deciding value which represents a ratio between a total number of the halftone dots in a neighboring area and the number of the halftone dots having a similarity of feature being smaller than a predetermined threshold value in the neighboring area. The re-calculation deciding unit decides whether the threshold value should be changed in order to decide necessity of change of the number of dots based on the re-calculation deciding value. The halftone dot shape changing unit obtains an amount of change of the number of dots to be increased or decreased for a target halftone dot, based on an amount of feature of the halftone dots which are output when the threshold value is not changed in the neighboring area, an amount of the feature of the target halftone dot, and the number of dots of the target halftone dot.

9 Claims, 9 Drawing Sheets

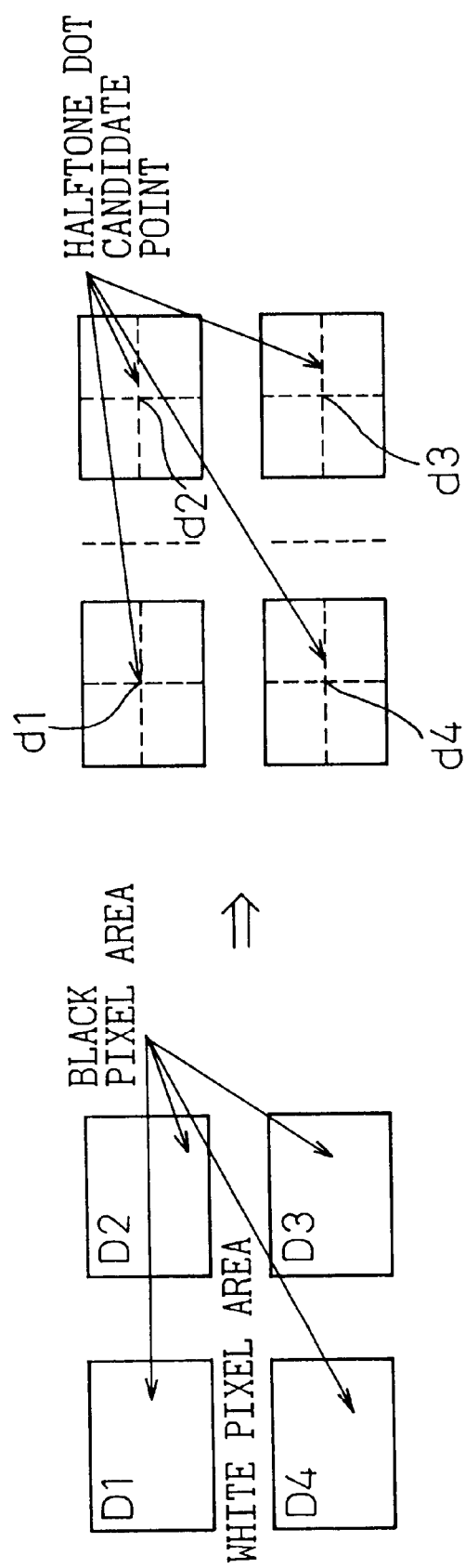

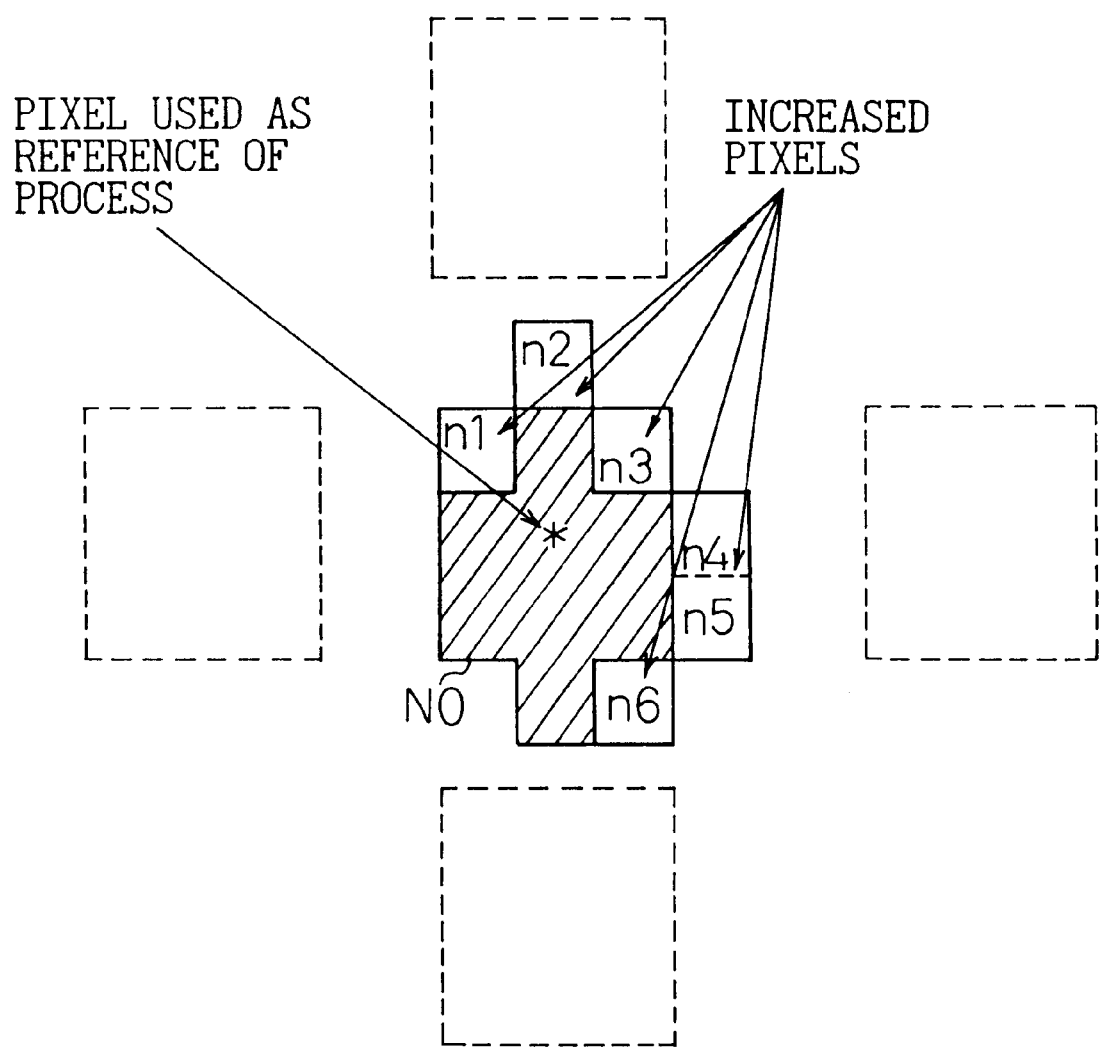

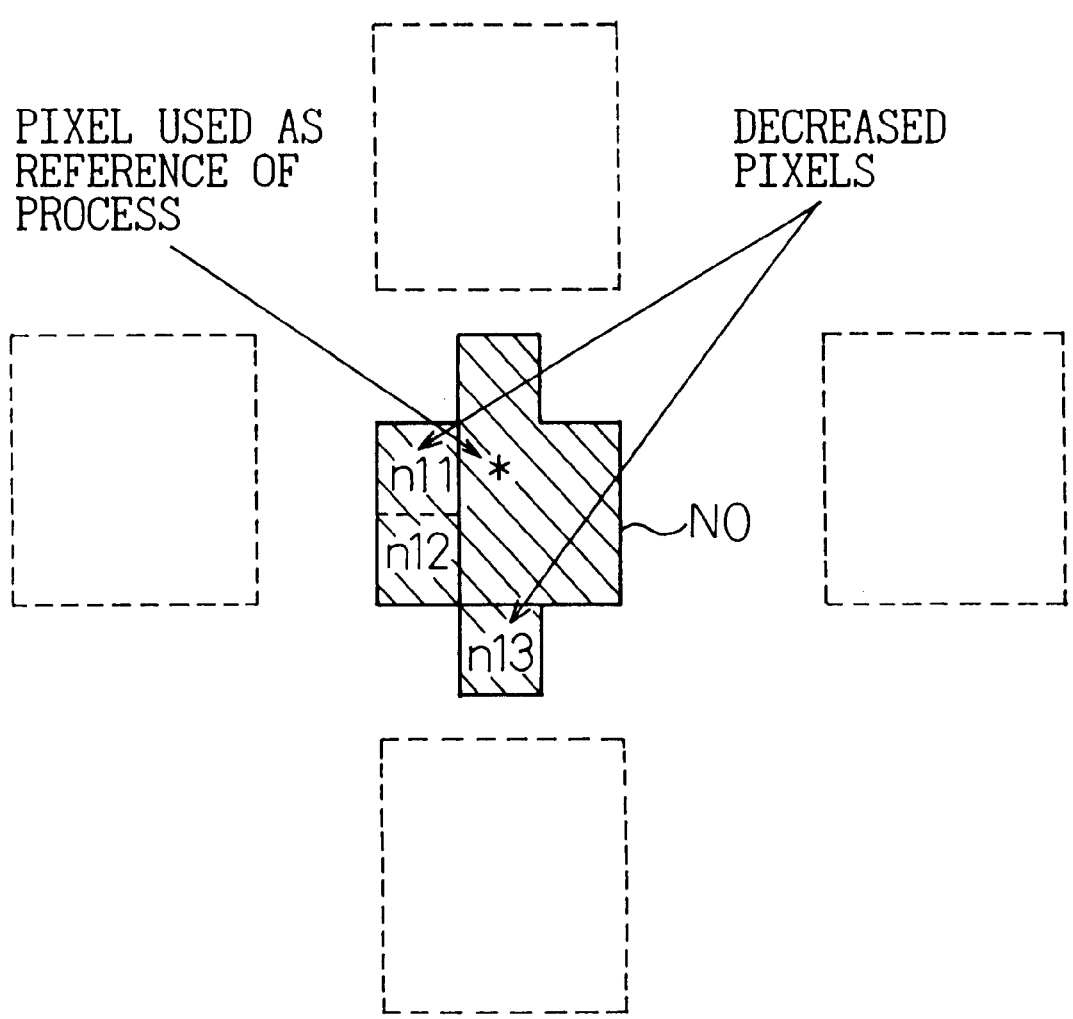

MOIRE FRINGE ELIMINATING APPARATUS AND A METHOD FOR ELIMINATING MOIRE FRINGES

BACKGROUND OF THE INVENTION

1. Field of the Invention

The present invention relates to a moire fringe eliminating apparatus and a method for eliminating moire fringes which occur on an image when displaying the image on a display apparatus, or which occur on a printed image when printing the image by a printer, after scanning a manuscript with halftone dots thereon.

2. Description of the Related Art

In general, moire fringes occur on an image when displaying the image on the display apparatus, or on a printed image when printing the image by the printer, after scanning the manuscript with halftone dots thereon.

Accordingly, it is necessary to eliminate the moire fringes in order to obtain high quality image on the display apparatus, or high quality printed image from the printer.

Conventionally, in order to eliminate the moire fringes, a mask having a predetermined square size (for example, 3×3 square) is provided on the scanned image, and an average value of density of the image dotted by halftone dots is calculated for the square size. Further, a space filtering process is directly performed on the image in order to obscure the moire fringes on the image.

In this case, however, the space filtering process is performed not only on the image having the moire fringes, but also on an normal image having no moire fringes. As a result, although the moire fringes can be eliminated, the normal image, having good quality, becomes worse in the conventional art.

SUMMARY OF THE INVENTION

The object of the invention is to provide a moire fringe eliminating apparatus which can eliminate sufficiently the moire fringes but can maintain good quality for the normal image.

Another object of the present invention is to provide a method for eliminating moire fringes which can eliminate clearly from the image, and can maintain the good quality of the normal image.

In accordance with a first aspect of the present invention, there is provided a moire fringe eliminating apparatus including a halftone dot recognizing unit for receiving image data and recognizing halftone dots on the image data and a moire fringe eliminating unit for eliminating moire fringes on the halftone dots, wherein the moire fringe eliminating unit comprises;

a halftone dot feature extracting unit for extracting features of the halftone dots;

a re-calculation unit for obtaining a re-calculation deciding value which represents a ratio between a total number of the halftone dots in a neighboring area and the number of the halftone dots having a similarity of feature being smaller than a predetermined threshold value in the neighboring area;

a re-calculation deciding unit for deciding whether the threshold value should be changed in order to decide necessity of change of the number of dots based on the re-calculation deciding value; and a halftone dot shape changing unit for obtaining an amount of change of the number of dots to be increased or decreased for a target halftone dot, based on an amount of feature of the halftone dots which are output when the threshold value is not changed in the neighboring area, an amount of the feature of the target halftone dot, and the number of dots of the target halftone dot.

In a preferable embodiment, the amount of change of the number of dots to be increased or decreased is obtained from at least one of the following values, i.e., the number of the halftone dots having similar features existing in the neighboring area of the target halftone dot, a dimension of slippage between a center of gravity of the target halftone dot and the center of the gravity of the neighboring dots, and a dimension of slippage between a center of a circumscribed square of the target halftone dot and the center of the circumscribed square of the neighboring halftone dots.

In another preferable embodiment, the change of pixels of the target halftone dot is changed based on the amount of change of dots to be increased or decreased for the target halftone dot.

In accordance with a second aspect of the present invention, there is provided a method for eliminating the moire fringes used in a moire fringe eliminating apparatus, including the steps of:

setting initial values of various parameters used in a moire fringe eliminating process;

extracting features of all halftone dots which can be recognized;

calculating a similarity between a target halftone dot and features of other halftone dots;

calculating values to be added for each feature of the halftone dots in which the similarity is smaller than a predetermined threshold value;

calculating values used for determining necessity of the re-calculation based on the number of the halftone dots added in the halftone feature adding step;

changing various parameters used for eliminating the moire fringes in accordance with the values in the re-calculation;

calculating an amount of change of halftone dot pixels in order to obtain the amount of change of the target halftone dot, by using an average value of added values obtained in the halftone dot feature adding step, and the feature value of the target halftone dot;

deciding the necessity of change of the target halftone dot pixels based on the amount of change of the target halftone dot; and changing the pixel of the target halftone dot based on the amount of the change.

In a preferable embodiment, the step for changing various parameters used for eliminating the moire fringes in accordance with the re-calculation value, is executed based on at least one of the following three parameters, i.e., the number of halftone dots having similar feature and existing in the neighboring area of the target halftone dot; a center of a gravity of the neighboring halftone dots; and a dimension of slippage of a center of a circumscribed square.

In another preferable embodiment, in the step for changing the pixel of the target halftone dot based on the amount of change and the change of the halftone dot is executed based on correction of slippage for either the center of the gravity in the neighboring halftone dots, or the center of the circumscribed square.

BRIEF DESCRIPTION OF THE PREFERRED EMBODIMENTS

FIGS. 4A and 4B are views for explaining pixels used as a halftone dot candidate;

FIGS. 10A and 10B are views for explaining change state of-halftone dot pixels.

DESCRIPTION OF THE PREFERRED EMBODIMENTS

Figure 1:
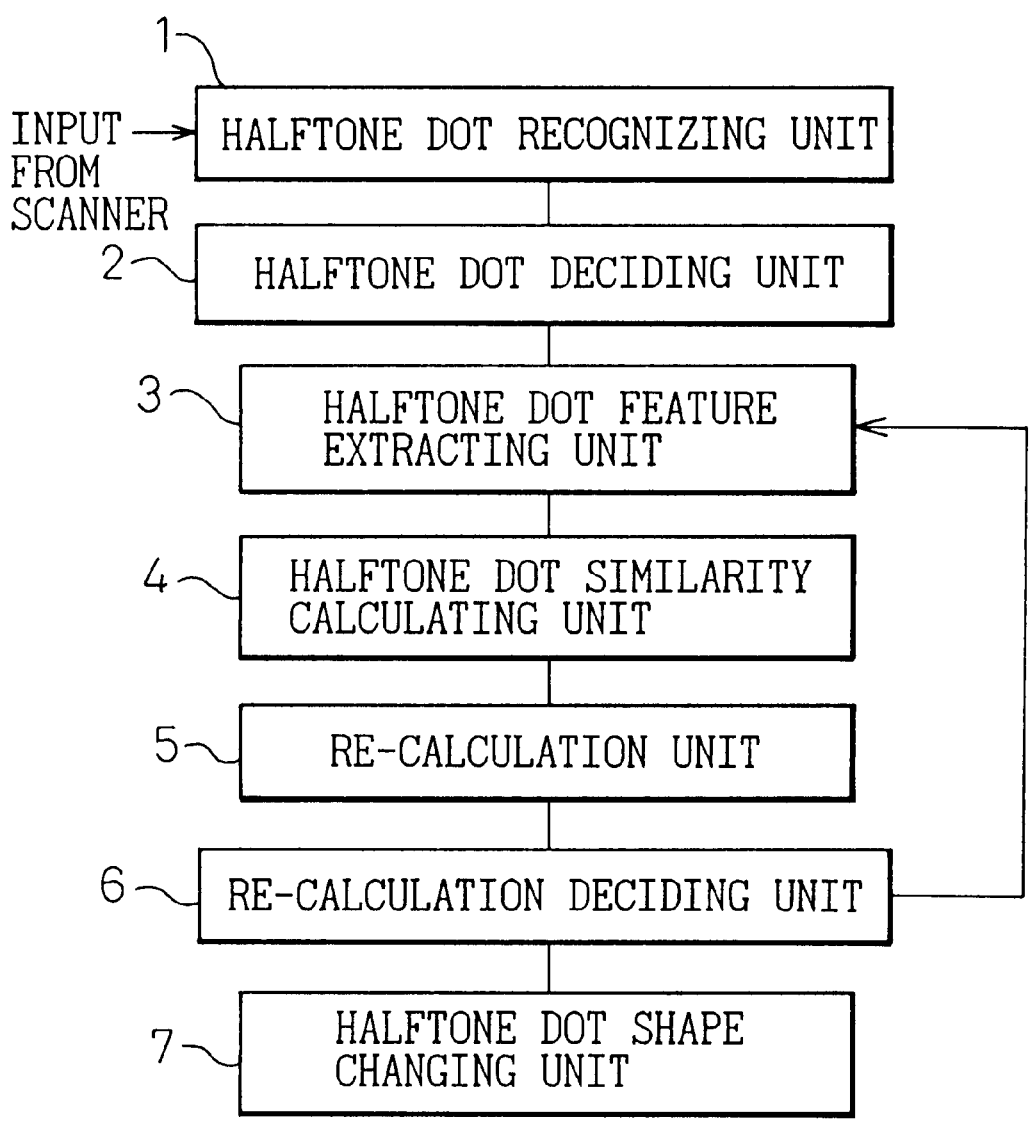
FIG. 1 is a view for explaining a principle of the present invention.

FIG. 1 is a view for explaining a principle of the present invention. In FIG. 1, reference number 1 denotes a halftone dot recognizing unit, reference number 2 denotes a halftone dot deciding unit, reference number 3 denotes a halftone dot feature extracting unit, reference number 4 denotes a halftone dot similarity calculating unit, reference number 5 denotes a re-calculation unit, reference number 6 denotes a re-calculation deciding unit, and reference number 7 denotes a halftone dot shape changing unit.

When an image data is output from a scanner (not shown) to the-halftone dot recognizing-unit 1, the halftone dot recognizing unit 1 sequentially extracts a halftone dot candidate area which is formed of a group of black pixels or white pixels, and prepares a halftone dot candidate list for all input image data. When preparing the list, either a contracting process (explained in detail below) for the halftone dot candidate area, or cross-points of straight lines which are formed of middle points obtained by continuous black pixels to the X- and Y-directions is used.

Next, in order to determine whether the halftone dot candidate points are halftone dots, the halftone dot deciding unit 2 obtains a circumscribed square for the group of the pixels of the halftone dot candidate points. When a size of the square is larger than a predetermined threshold value, it is determined that the halftone dot candidate points are characters or patterns and these points are eliminated so that remaining points are recognized as the halftone dots.

The halftone dot feature extracting unit 3 extracts slippage between halftone dot and the features, such as the number of dots, a size S, a density, etc., of a target halftone dot, for all halftone dots on the. halftone dot candidate list in the neighboring area of the target halftone dot. At that time, when the halftone dots in which the feature value is abnormal (for example, the density is larger than 1.0), the target halftone dot is eliminated from the coordinate value list. Further, when the slippage is larger than a predetermined threshold value, since the slippage indicates high possibility of moire fringes, a size of the area in the neighboring area of the target halftone dot, a threshold value of similarity of the halftone dot, and another threshold value for determining presence or absence of change of pixels, are enlarged based on a predetermined ratio so that an amount of change of the pixel becomes large.

Next, the halftone dot similarity calculating unit 4 selects the halftone dots which are not processed in the neighboring area of the target halftone dot, and calculates the similarity between the target halftone dot and the selected halftone dot. Further, the calculating unit 4 recognizes the halftone dots in which an average value of the target halftone dot should be calculated and have the same similarity.

Next, the re-calculation unit 5 obtains a re-calculation deciding value as a rate of the total number of the halftone dots in the neighboring area and the halftone dots in which the similarity is smaller than the threshold value. When the re-calculation deciding value is smaller than the predetermined value, since it is considered that an area, for example, an edge, in which change of shape of the halftone dot is large, the size of the neighboring area of the target halftone dot, the threshold value of the similarity of the halftone dot and the threshold value for determining the presence or absence of change of the pixel, are set to smaller values based on the predetermined ratio in the re-calculation deciding unit 6 so that the amount of change of the pixel become small.

When the re-calculation deciding value is larger than the predetermined threshold value, since it is considered as a change of shape is not sufficiently caught, i.e., a state of the moire fringes is not sufficiently caught, the size of the neighboring area of the target halftone dot, the threshold value of the similarity of the halftone dot and the threshold value for determining presence or absence of change of pixels, are enlarged, based on the predetermined ratio, in the re-calculation deciding unit 6.

When the threshold value is changed, the halftone dot feature extracting unit 3 executes the same processes as mentioned above. Further, when the re-calculation deciding value is smaller than the threshold value, the change of shape of the halftone dot is performed. In this case, when the re-calculation deciding value is not smaller than the threshold value after repetition of predetermined times, the change of shape of the halftone dot is performed again.

The halftone dot shape changing unit 7 obtains an average value between an amount of feature of the target halftone dot and an amount of feature in the neighboring area, and obtains an amount of change of the halftone dot pixel based on an amount of change. Further, based on the amount of change, the change of the amount of pixel is executed. In this case, when the amount of change is smaller than the threshold value, for example, one dot, it is considered as the possibility of moire fringes is low so that change of the pixel is not executed.

As a result, it is possible to eliminate the moire fringes on the image without deterioration of the quality of the image.

Figure 2:
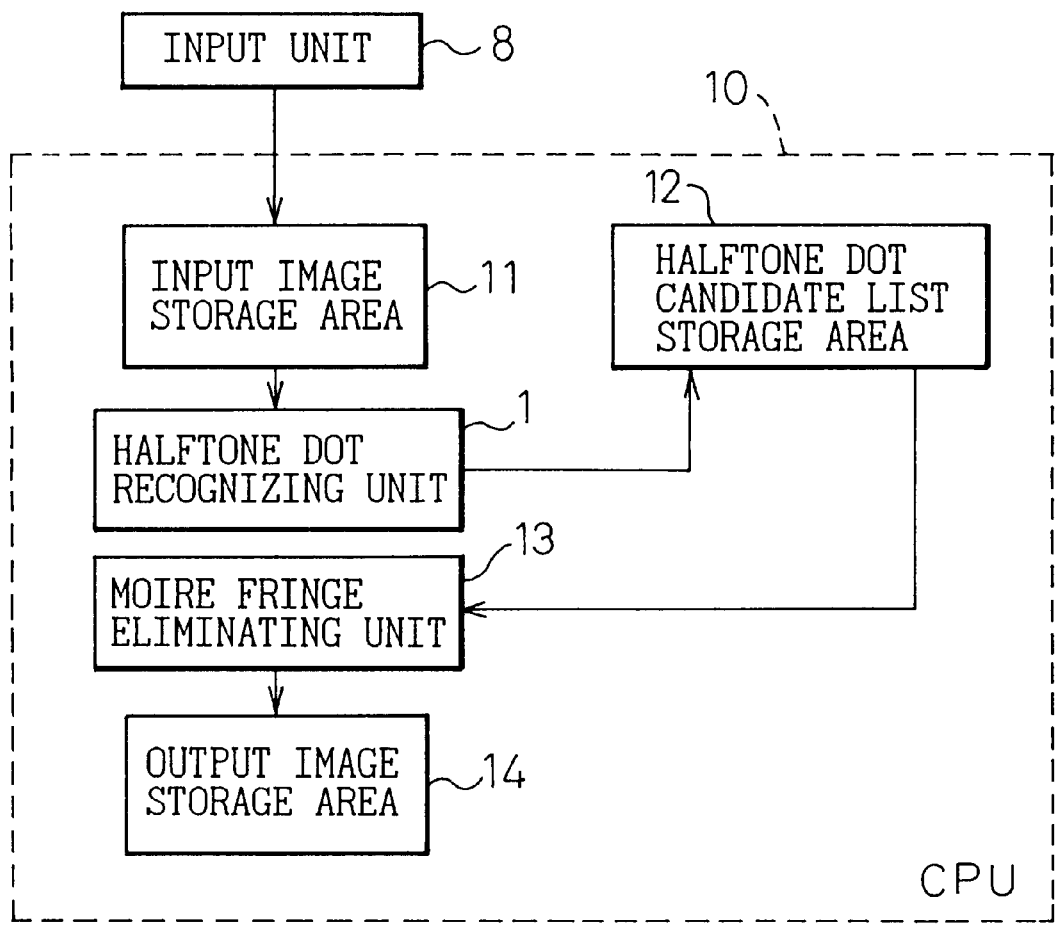
FIG. 2 is a view for explaining one embodiment of the present invention.
Figure 3:
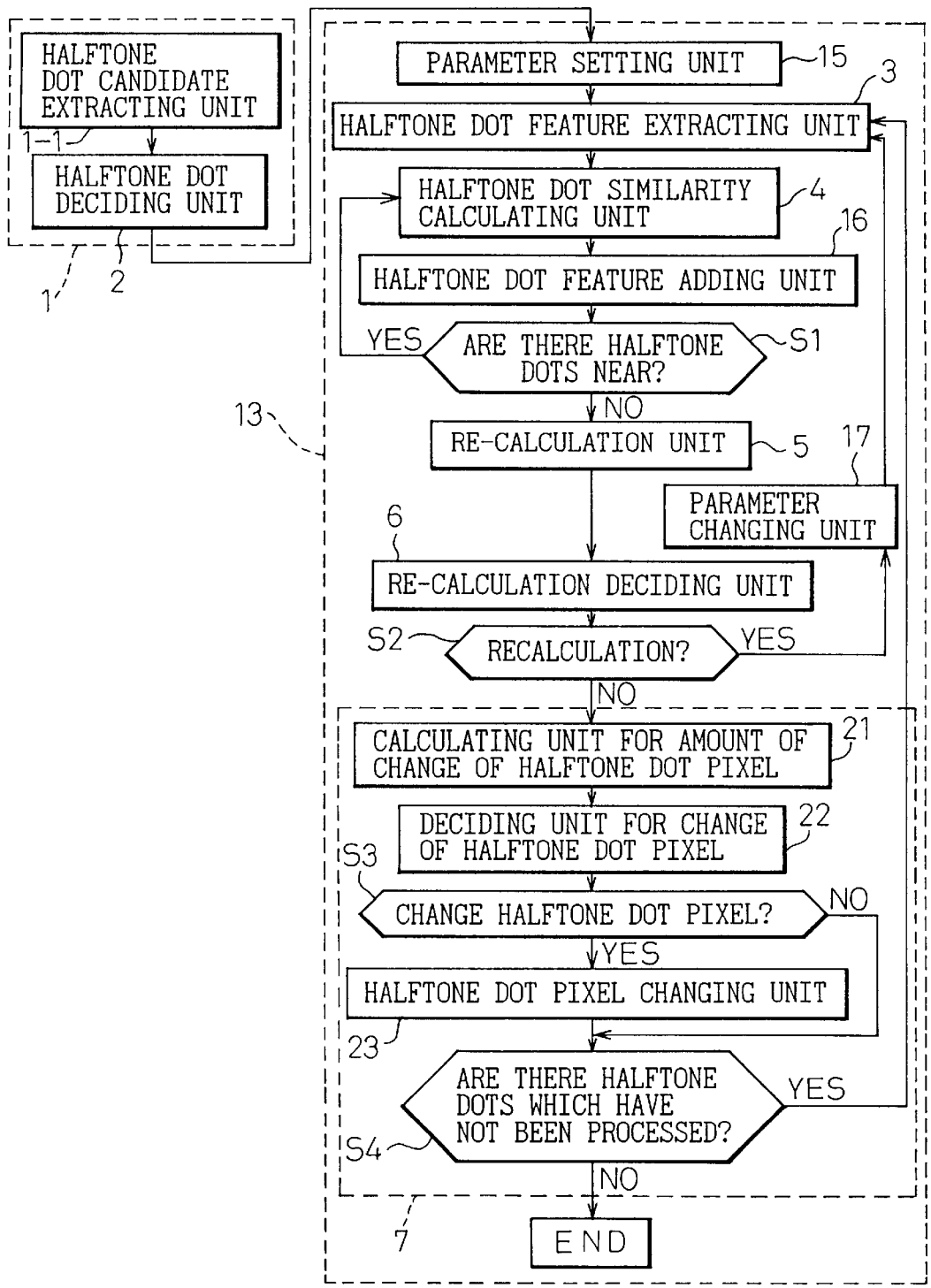
FIG. 3 is a flowchart for explaining process steps of the present invention.
Figure 4A:
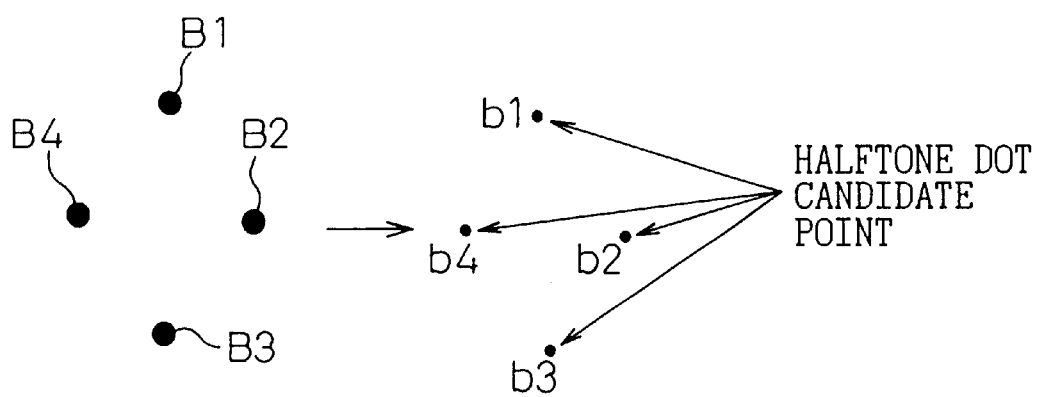
Figure 5:
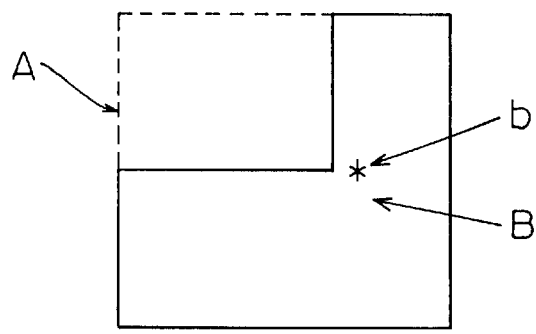
FIG. 5 is a view for explaining extraction of a halftone dot area.
Figure 6:
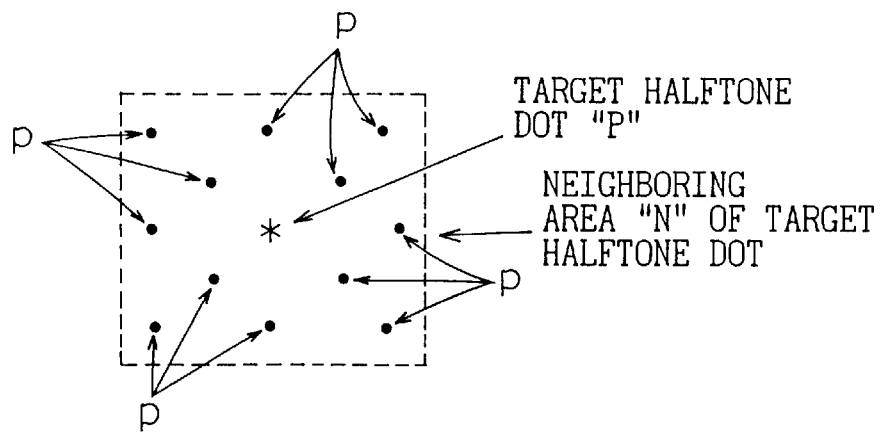
FIG. 6 is a view for explaining a neighboring area of a target halftone dot.
Figure 7:
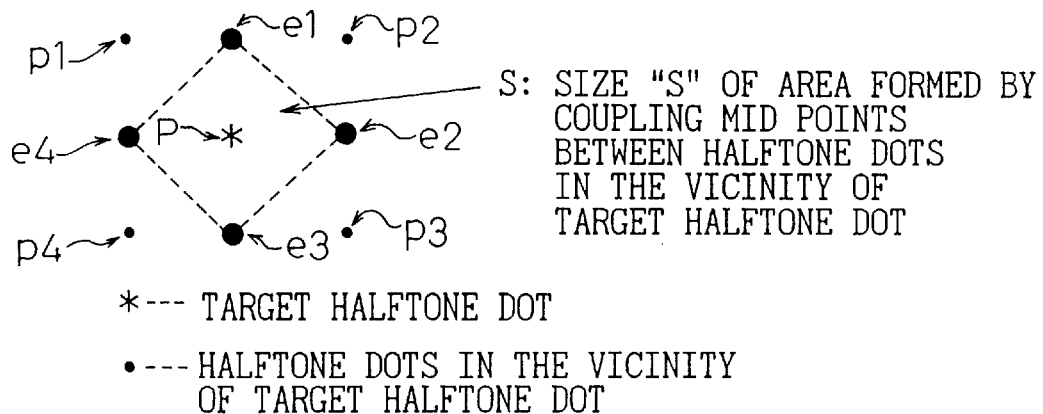
FIG. 7 is a view for explaining density of halftone dots.
Figure 8:
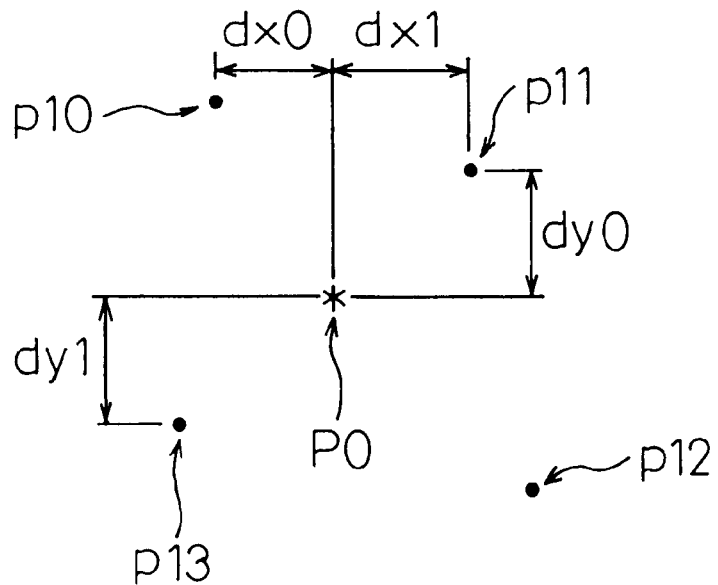
FIG. 8 is a view for explaining slippage between halftone dots.
Figure 9:
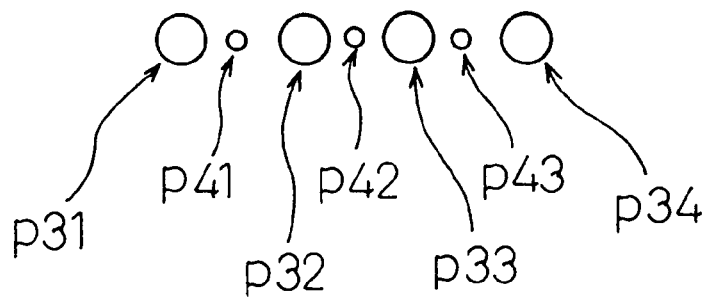
FIG. 9 is a view for explaining an arrangement for similar state of halftone-dots.

FIG. 2 is a view for explaining one embodiment of the present invention, FIG. 3 is a flowchart for explaining process steps of the present invention, FIGS. 4A and 4B are views for explaining pixels used as a halftone dot candidate, FIG. 5 is a view for explaining extraction of a halftone dot area, FIG. 6 is a view for explaining a neighboring area of a target halftone dot, FIG. 7 is a view for explaining density of halftone dots, FIG. 8 is a view for explaining slippage between halftone dots, FIG. 9 is a view for explaining an arrangement for similar state of halftone dots, and FIGS. 10A and 10B are views for explaining change state of halftone dot pixels.

In these drawings, reference number 8 denotes an input unit, reference number 10 denotes a central processing unit (CPU), reference number 11 denotes an input image storage area, reference number 12 denotes a halftone dot candidate list storage area (a memory), reference number 13 denotes a moire fringe eliminating unit, reference number 14 denotes an output image storage area (a memory), reference number 15 denotes a parameter setting unit, reference number 16 denotes a halftone dot feature adding unit, reference number 17 denotes a parameter changing unit, reference number 21 denotes a calculating unit for calculating an amount of change of halftone dot pixels, reference number 22 denotes a deciding unit for deciding change of halftone dot pixels, and reference number 23 denotes a halftone dot pixel changing unit.

As shown in FIG. 3, the halftone dot recognizing unit 1 includes a halftone dot candidate extracting unit 1-1 and the halftone dot deciding unit 2, and recognizes whether image data input by an image scanner (not shown) includes halftone dots. Further, an output of the halftone dot deciding unit 2 is provided to the moire fringes eliminating unit 13, and various processes are executed in the moire fringes eliminating unit 13 as explained in detail below.

The halftone dot candidate extracting unit 1-1 obtains the number of pixels within a pixel area which is considered as halftone dots in a previous setting area for the input image data. Further, the halftone dot candidate extracting unit 1-1 determines each of the pixels or each of the cross-points of straight lines as the halftone dot candidate. In this case, each pixel is obtained based on a contraction process for either white pixels or black pixels, and each cross-point of straight lines is obtained by a middle point in continuous areas for X- and Y-directions.

The above contraction process for white pixels of black pixels is performed as follows. That is, as shown in FIG. 4A, the pixels are eliminated in order one by one from outside in each area B1, B2, B3 and B4 to be processed, so that the pixels are contracted one by one. Further, pixels b1, b2, b3 and b4 which are obtained finally, are determined as the halftone dot candidate points.

Further, as shown in FIG. 4B, in each pixel area D1, D2, D3 and D4, the halftone dot candidate extracting unit 1-1 determines cross-points d1, d2, d3 and d4 of straight lines, which are obtained by continuous black pixels (or white pixels) in the X-direction or Y-direction, as halftone dot candidate points.

The halftone dot candidate extracting unit 1-1 stores coordinate values of each pixel used as the halftone dot candidate obtained by the above steps, into the storage area 12 for the halftone dot candidate list shown in FIG. 2 in order to prepare a list of coordinate values of the halftone dot candidate.

The halftone dot deciding unit 2 determines whether the halftone dot candidate is formed of the halftone dot. As mentioned above, after preparation of the list of the halftone dot candidate, the halftone dot deciding unit 2 performs labeling process based on the pixels on the coordinate value list, for all pixels on the coordinate value list of the halftone dot candidate.

For example, as shown in FIG. 5, the halftone dot deciding unit 2 performs the labeling process based on the pixel "b" on the coordinate value list, and extracts an area B including the pixel "b" as the halftone dot area. In this case, when a size of a square A, which contacts to the area B in which the labeling process was performed, exceeds a predetermined threshold value, the halftone dot deciding unit 2 determines as the area B is formed of, for example, characters or patterns and not formed of halftone dots, and eliminates this area B from the halftone dot candidate list.

The halftone dot feature extracting unit 3 extracts the features of halftone dots, for example, a size S, a density, the number of dots, etc., and further extracts the slippage between halftone dots.

Further, the halftone dot feature extracting unit 3 selects a halftone dot to be extracted as the feature on the halftone dot candidate list, as a target halftone dot. As shown in FIG. 6, for all halftone dots on the halftone dot candidate list existing within the neighboring area N including the target halftone dot P, the halftone dot feature extracting unit 3 obtains the features, such as, the number of dots, the size S, the density K, etc., within the size S. including the target halftone dot P as shown in FIG. 7, and further obtains the slippage between the target halftone dot P and each peripheral halftone dot as shown in FIG. 8.

As shown in FIG. 7, the size S of the target halftone dot P is determined by an area which is formed by coupling four middle points e1, e2, e3 and e4. In this case, each middle point is provided between halftone dots p1, p2, p3 and p4, and each of halftone dots p1, p2, p3 and p4 is provided in the vicinity of the target halftone dot P. Further, the density K of the target halftone dot P can be obtained from the following formula, since the number of dots is given by D and the size is given by "S".

$$K=D/S$$

Further, the slippage between halftone dots can be obtained as shown in FIG. 8. A center of the gravity of the target halftone dot or a center of a circumscribed square (below, a center of the target halftone dot) is given as a point P0. On the other hand, a center of the gravity of halftone dots in the vicinity of the target halftone dot or a center of circumscribed square (below, a center of the halftone dot) is given as points p10, p11, p12 and P13.

Further, in FIG. 8, the distance dx0 from the center P0 of the target halftone dot to the center of the nearest halftone dot at the left side, the distance dx1 from the center P0 of the target halftone dot to the center of the nearest halftone dot at the right side, the distance dy0 from the center P0 of the target halftone dot to the center of the nearest halftone dot at the upper side, and the distance dy1 from the center P0 of the target halftone dot to the center of the nearest halftone dot at the lower side, can be expressed by the following formulas.

The distance dx0 is the minimum value in the difference between the X-coordinate value of the center P0 of the target halftone dot and another X-coordinate value of the center of the halftone dot in which the X-coordinate value is smaller than the X-coordinate value of the center P0 of the target halftone dot.

The distance dx1 is the minimum value in the difference between the X-coordinate value of the center P0 of the target halftone dot and another X-coordinate value of the center of the halftone dot in which the X-coordinate value is larger than the X-coordinate value of the center P0 of the target halftone dot.

The distance dy0 is the minimum value in the difference between the Y-coordinate value of the center P0 of the target halftone dot and another Y-coordinate value of the center of the halftone dot in which the Y-coordinate value is smaller than the Y-coordinate value of the center P0 of the target halftone dot.

The distance dy1 is the minimum value in the difference between the Y-coordinate value of the center P0 of the target halftone dot and another Y-coordinate value of the center of the halftone dot in which the Y-coordinate value is larger than the Y-coordinate value of the center P0 of the target halftone dot.

Based on the above distances, the slippage Dx at the X-direction between halftone dots, and the slippage Dy at the Y-direction between halftone dots, can be expressed as follows.

$$Dx = dx1 - dx0$$

$$Dy = dy1 - dy0$$

In this case, the halftone dot in which the extracted feature value is abnormal (for example, the density is larger than 1.0) is determined to be dust, and such a halftone dot is eliminated from the coordinate value list of the halftone dot candidate.

Further, when the slippage is larger than a predetermined value, there is a high possibility that the slippage is moire fringes. Accordingly, in this case, the parameter changing unit 17 sets a size of the neighboring area of the target halftone dot, a threshold value for the similarity of the halftone dot and another threshold value for determining necessity of change of the pixel, to a larger value based on a predetermined rate so that an amount of change of the pixels becomes large.

The halftone dot similarity calculating unit 4 obtains the similarity Si of the feature based on the following formula.

$$Si = \Sigma |1.0 - gi/gj| \tag{1}$$

Where, gi is a feature value of the halftone dot in the neighboring area, gj is a feature value of the target halftone dot, Σ is a sum of kinds of features, and

| | is a symbol of an absolute value.

As mentioned above, "gi" is the feature value of the halftone dot in the neighboring area, and the feature value is given by, for example, the density or the number of dot. Further, as mentioned above, "gj" is the feature value of the target halftone dot. Accordingly, when the target halftone dot is similar to the neighboring halftone dot, since "gi" and "gj" have a similar value, a ratio gi/gj is set to approximately "1".

The halftone dot feature adding unit 16 determines these feature values as explained below. When the calculated value is smaller than a threshold value which is set in the parameter setting unit 15, the feature value of the halftone dot, which is selected in a predetermined area, is added for each feature. Further, the halftone dot feature adding unit 16 counts the number of halftone dots which satisfy the above conditions, i.e., the calculated similarity being smaller than the threshold value. In this case, when performing the above addition, it may be possible to use a weighted and added value in which the distance between the halftone dot and the target halftone dot is considered.

Further, when the halftone dot feature adding unit 16 counts the number of the halftone dots which satisfies the above conditions, it is necessary to count a total number of the halftone dots within the neighboring area, regardless of whether the calculated similarity is smaller than the threshold value.

When there are no halftone dots in the neighboring area (NO, in step S1 in FIG. 3), the re-calculation unit 5 calculates a re-calculation deciding value R based on the following formula by using the total number M of the halftone dots in the neighboring area and the number "m" of the halftone dots in which the calculated similarity is smaller than the threshold value, and these are counted in the halftone dot feature adding unit 16.

$$R = m/M$$

The re-calculation deciding unit 6 determines whether the re-calculation deciding value R, which is calculated in the re-calculation unit 5, is smaller than a predetermined threshold value (step S2 in FIG. 3). When the re-calculation deciding value R is smaller than the predetermined threshold value, i.e., when the number of the similar halftone dots is small in the neighboring area, the neighboring area is considered as the area, for example, an edge, in which the change of shape of the halftone dots is very large.

Accordingly, in the parameter changing unit 17, the size of the neighboring area for the target halftone dot, the threshold value for the similarity of the halftone dot, and another threshold value for deciding presence or absence of change of the pixel, are set to smaller value based on the predetermined rate so that an amount of change of pixels becomes small.

Contrary, when the re-calculation deciding value R is larger than the predetermined threshold value, this area is considered as the moire fringes. In this case, since it is considered that the change of shape of the halftone dot is not sufficiently caught, i.e., since it is considered that the state of the moire fringes is not caught, it is necessary to set each threshold value to the larger value based on the predetermined rate.

The halftone dot shape changing unit 7 shown in FIG. 1 calculates an amount of change for changing the halftone dot pixel, determines whether the pixel having small amount of change should be changed, and determines which position of the pixel should be changed when, changing the halftone dot pixel.

As shown in FIG. 3, the halftone dot shape changing unit 7 includes a calculation unit 21 for calculating the number of pixels to be changed, a deciding unit 22 for deciding change of halftone dot pixel, and a changing unit 23 for changing the halftone dot pixel. In this case, the calculation unit 21 obtains the number of pixels to be changed. The deciding unit 22 controls the amount of change in such a way as the change of the pixel is not executed when the calculated amount of change is smaller than the predetermined threshold value (for example, one pixel, or two pixels). Further, the changing unit 23 determines which position of the pixel is changed when changing the halftone dot pixel.

The calculation unit 21 for calculating the amount of change of the halftone dot pixel obtains an amount of feature T1 of the target halftone dot, an amount of average feature T0 of the halftone dots in the neighboring area of the target halftone dot, and an amount of change d1 based on the number of dots d0 of the target halftone dot.

As the amount of average feature T0, when there are plural features, for example, the number of dots, the density, the slippage of the position, etc., conversion values are prepared based on these values in order to totally determine the amount of features, and an average value of the values added by the conversion values is used for calculating the amount of the average features. In this case, the weighted and added values which are weighted by the amount of feature based on the kind of feature, may be used as the amount of the average feature as follows.

$$d1 = d0 \times (T0/T1) - d0 \tag{2}$$

Where, d0 is the number of dots of the target halftone dot,

T0 is an amount of features of the halftone dots in the neighboring area, and

T1 is an amount of features of the target halftone dots.

When the amount of change calculated by the calculating unit 21 is smaller than a threshold value which is previously set in the parameter setting unit 15, the change deciding unit 22 determines as the possibility of the moire fringes is low, and does not to change the pixel.

When the deciding unit 22 determines as the amount of change exceeds the threshold value (YES, in step S3 in FIG. 3), the halftone dot pixel changing unit 23 executes addition or elimination of the pixels for the pixel of the target halftone dot as shown in FIGS. 10A and 10B.

In this case, the halftone dot pixel changing unit 23 determines the position of the pixel to be added or to be eliminated based on the slippage obtained in the feature extracting unit 3 as explained in FIG. 8. After the above steps, when there are no halftone dots to be processed (NO, in step S4 in FIG. 3), the processes in the moire fringes eliminating unit 13 are completed.

For example, in the case of addition of the pixels as shown in FIG. 10A, in the area NO including a pixel "*" used as a reference of process, when the symbol is defined as the position in which the slippage to the X- and Y-directions is added to either the center of the gravity of the halftone dot or the center of the circumscribed square, the addition of pixels are performed from the side in which there are gaps based on the slippage as explained below.

That is, in FIG. 8, when the slippage Dx to the x-direction is positive, it is possible to determine that there is the gap at the right side. When the slippage Dx to the X-direction is negative, it is possible to, determine that there is the gap at the left side. Further, when the slippage Dy is positive, it is possible to determine that there is the gap at the lower side. When the slippage Dy is negative, it is possible to determine that there is the gap at the upper side. Accordingly, as shown in FIG. 10A, when addition of the pixels is executed, the pixels n1, n2, . . . , n6 are sequentially added so as to become uniform by burying the gaps. In this case, the pixels n1 to n6 represent increased pixels.

On the contrary, as shown in FIG. 10B, when eliminating the pixels, the pixels n11, n12, n13, are sequentially reduced from the filled portion. In this case, pixels n11 to n13 represent decreased pixels.

In this case, the parameter setting unit 15 sets initial values, for example, the size of the neighborhood of the target halftone dot, the threshold value of the similarity of the halftone dot used in the halftone dot feature adding unit 16, the threshold value for determining whether the re-calculation deciding value R used in the re-calculation deciding unit 6 is large or small, and the threshold value for determining necessity of change of the pixel of the target halftone dot used in the change deciding unit 22.

The halftone dot feature adding unit 16 adds total number of the halftone dots in the neighboring area and adds the features of the halftone dot for each feature when the similarity is smaller than the threshold value.

As shown in FIG. 9, the halftone dots p31, p32, p33 and p34 have similar features to each other, and the halftone dots p41, p42 and p43 have similar features to each other. However, since the halftone dots p31 to P34 and the halftone dots p41 to p43 have different features from each other, it is necessary to handle these halftone dots in a different way and to add these halftone dots in accordance with the features. In addition of the halftone dots based on the features, it may be possible to use the weighted and added value in which the distance between the target halftone dot and the halftone dot is considered.

The parameter changing unit 17 controls the threshold value so as to become small or large of a predetermined rate, when the re-calculation deciding unit 6 determines whether the re-calculation deciding value R calculated in the recalculating unit 5 is larger or smaller than the predetermined threshold value, and when the re-calculation deciding unit 6 determines that it is necessary to change the threshold value.

The operations of the present invention are explained in detail below.

In FIG. 2, the halftone dot image data which is output from the input unit 8, such as a scanner, is input to the processor (CPU) 10, and the input image data is stored in the input image storage area 11 which is formed of a part of a memory.

The halftone dot recognizing unit 1 obtains the halftone dot candidate point from the input image data, and determines whether the image data includes the halftone dot. That is, the halftone dot candidate extracting unit 1-1 reads the image data, and performs the contracting process in the processing area. Further, the pixel obtained by the contracting process is decided as the halftone dot candidate point. Further, it is possible to determine the cross-points of the straight lines, which are formed of the middle points of the continuous white pixels or black pixels to the X- and Y-directions, as the halftone dot candidate point. Still further, the coordinate value list of the halftone dot candidate points is prepared, and the halftone dot candidate points are stored in the storage area 12 for the halftone dot candidate list in the memory.

Further, the halftone dot deciding unit 2 performs the labeling process for all pixels on the coordinate value list of the halftone dot candidate points stored in the storage area 12, based on the pixels on the coordinate value list. As shown in FIG. 5, the area B including the pixel "b", on the coordinate value list is extracted as the halftone dot area. Further, the circumscribed square A is determined for the area B in which the labeling process was performed. When the size of the circumscribed square A exceeds a predetermined threshold value, it is determined as this area A is, for example, characters and patterns, not the halftone dots, and eliminated from the coordinate value list of the halftone dot candidate.

Next, in the moire fringe eliminating unit 13, the parameter setting unit 15 determines the size of the neighboring area N of the target halftone dot P shown in FIG. 6, the threshold value of the similarity of the halftone dot used in the halftone dot feature adding unit 16, and the initial value used for determining presence or absence of change of the pixel of the target halftone dot.

Further, the halftone dots on the halftone candidate list, in which the above processes are not performed, are selected as the target halftone dot. In the halftone dot feature extracting unit 3, the features in FIG. 7, i.e., the number of dots of the target halftone dot P, the size S and the density K, etc., and the slippage Dx and Dy between. halftone dots shown in FIG. 8, are extracted for all halftone dots "p" on the halftone dot candidate list in the neighboring area of the target halftone dot P shown in FIG. 6. When the extracted feature values are abnormal halftone dots, for example, the density being larger than 1.0, the abnormal halftone dots are eliminated from the coordinate value list of the halftone dot candidates.

In this case, when the size of the slippage is larger than the predetermined value, since there may be a high possibility of moire fringes, the size of the neighboring area of the target halftone dot, the threshold value of the similarity of the halftone dot, and the threshold value for determining presence or absence of change of pixel, are enlarged based on the predetermined rate in the parameter changing unit 17 so that an amount of change of the pixels becomes large.

Next, the halftone dot similarity calculating unit 4 selects the halftone dots, which are not processed and provided in the neighboring area N of the target halftone dot P shown in FIG. 6, and calculates the similarity Si between target halftone dot and the selected halftone dot based on the formula (1). When the calculated value is smaller than the threshold value which is set in the parameter setting unit 15, the halftone dot feature adding unit 6 adds the feature values of the halftone dots selected in this area for each feature, and counts total number of the halftone dots in which the calculated similarity Si are smaller than the threshold value.

These processes are repeated during presence of non-processed halftone dots in the neighboring area. In this case, it may be possible to use the weighted and added values in which the distance between the target halftone dot and the halftone dot is considered when adding the feature values for each feature. Further, the total number of the halftone dots in the neighboring area are counted regardless of the calculated similarity being smaller than the threshold value.

In the recalculating unit 15, the re-calculation deciding value R is obtained by using the total number M of the halftone dots counted in. the halftone dot feature adding unit 16, and the number "m" of the halftone dots in which the calculated similarity is smaller than the threshold value.

In the re-calculation deciding unit 6, when the calculated re-calculation deciding value R is smaller than the predetermined threshold value decided in the parameter setting unit 15, i.e., when there are no similar halftone dots, the re-calculation deciding unit 6 determines that there is necessity of the re-calculation, since it is considered as the change of shape of the halftone dot at the edge, etc., is large in the neighboring area. In this case, in the parameter changing unit 17, the size of the neighboring area of the target halftone dot, the threshold value of the similarity of the halftone dot, and the threshold value for determining necessity of the change of the pixel, are set so as to become smaller value based on the predetermined rate so that the amount of change of the pixel becomes small.

On the contrary, when the re-calculation deciding value R is larger than the predetermined threshold value, since the change of shape of the halftone dot may be not sufficiently caught, i.e., since the state of the moire fringes may not be caught, the size of the neighboring area of the target halftone dot, the threshold value of the similarity of the halftone dot, and the threshold value for determining necessity of change of the pixel, are enlarged based on the predetermined rate.

Further, in the both cases that either the threshold value is set to a smaller value or a larger value based on the predetermined rate, the above mentioned processes are executed again from the halftone dot feature extracting unit 3, and the above mentioned operations are repeated starting from the feature extraction in the halftone dot feature extracting unit 3. Further, the re-calculation deciding unit 6 determines whether the re-calculation should be executed again. At that time, the times of the re-calculation are counted, and when the counted value reaches a predetermined number of times and when it is determined that re-calculation is not necessary, the re-calculation is not executed, and the process is moved to the halftone dot shape changing unit 7.

In the halftone dot shape changing unit 7, the calculation unit 21 for calculating an amount of change of the halftone dot pixel obtains-the average value of the added amount. Further, as expressed by the formula (2), the calculation unit 21 obtains the number of pixels which are the amount d1 of change of the target halftone dot pixels which are proportional to the average amount of the feature and the feature of the target halftone dot, based on the average amount of the feature T0 of the halftone dots in the neighboring area of the target halftone dot, the amount of the feature T1 of the target halftone dot, and the number of dots d0 of the target halftone dot.

The halftone pixel change deciding unit 22 compares the above number of pixels with the threshold value which is set in the parameter setting unit 15. When the number of the pixels is smaller than the threshold value, the deciding unit 22 determines that the possibility of moire fringes is low. As a result, the pixel of the target halftone dot is not changed. However, when the number of pixels is larger than the threshold value, the halftone pixel changing unit 23 performs the changing process of the pixels based on the amount of change as shown in FIGS. 10A and 10B. The changed pixels are stored in order into the output image storage area 14 in FIG. 2. The above processes are repeated until there are no halftone dots to be processed.

In this embodiment, each of units shown in FIG. 3 is constituted by a predetermined program and stored in a main memory. The program in each unit is executed by the CPU 10 in FIG. 2. Further, the programs in units are executed in computers included in a typical personal computer, a work station, etc. These computers are constituted by hardware each including processors, memories, file devices, disk devices, keyboards, etc.

These programs according to the present invention are installed into the computer. When installing the programs, these programs are stored in a portable storage, such as a floppy disk, an optical-magnetic disk, and installed into a file device in the computer, through a predetermined drive apparatus, or a predetermined network, such as a LAN (Local Area Network). Program steps necessary for executing the present invention are read from the file device to the main memory in the CPU 10.

Although the above embodiments are explained in the case of black pixels, it is possible to realize the present invention for white pixels.

What is claimed is:

1. A moire fringe eliminating apparatus including, a halftone dot recognizing means for receiving image data and recognizing halftone dots on the image data, and a moire fringe eliminating means for eliminating moire fringes on the halftone dots, wherein the moire fringe eliminating means comprises;
   a halftone dot feature extracting means for extracting features of the halftone dots;
   a re-calculation means for obtaining a recalculation deciding value which represents a ratio between a total number of the halftone dots in a neighboring area and the number of the halftone dots having a similarity of feature being smaller than a predetermined threshold value in the neighboring area;
   a re-calculation deciding means for deciding whether the threshold value should be changed in order to decide the necessity of change of the number of dots based on the re-calculation deciding value; and
   a halftone dot shape changing means for obtaining an amount of change of the number of dots to be increased or decreased for a target halftone dot, based on an amount of a feature of the halftone dots which are output when the threshold value is not changed in the neighboring area, an amount of the feature of the target halftone dot, and the number of dots of the target halftone dot.

2. A moire fringe eliminating apparatus as claimed in claim 1, wherein the amount of change of the number of dots to be increased or decreased is obtained from at least one of the following values, i.e., the number of the halftone dots having similar features existing in the neighboring area of the target halftone dot, a dimension of slippage between a center of gravity of the target halftone dot and the center of the gravity of the neighboring dots, and a dimension of slippage between a center of a circumscribed square of the target halftone dot and the center of the circumscribed square of the neighboring halftone dots.

3. A moire fringe eliminating apparatus, as claimed in claim 1, wherein the change of pixels of the target halftone dot is changed based on the amount of change of dots to be increased or decreased for the target halftone dot.

4. A method for eliminating moire fringes used in a moire fringe eliminating apparatus, comprising the steps of:

setting initial values of various parameters used in a moire fringe eliminating process;

extracting features of all halftone dots which can be recognized;

calculating a similarity between a target halftone dot and features of other halftone dots;

calculating values to be added for each feature of the halftone dots in which the similarity is smaller than a predetermined threshold value;

calculating values used for determining necessity of the re-calculation based on the number of the halftone dots added in the halftone feature adding step;

changing various parameters used for eliminating the moire fringes in accordance with the values in the re-calculation;

calculating an amount of change of halftone dot pixels in order to obtain the amount of change of the target halftone dot, by using an average value of added values obtained in the halftone dot feature adding step, and the feature value of the target halftone dot;

deciding necessity of change of the target halftone dot pixels based on the amount of change of the target halftone dot; and changing the pixels of the target halftone dot based on the amount of the change.

5. A method for eliminating moire fringes as claimed in claim 4, wherein the step for changing various parameters used for eliminating the moire fringes in accordance with the re-calculation value, is executed based on, at least one of the following three parameters, i.e., the number of halftone dots having a similar feature and existing in the neighboring area of the target halftone dot; a center of a gravity of the neighboring halftone dots; and a dimension of slippage of a center of a circumscribed square.

6. A method for eliminating moire fringes as claimed in claim 4, wherein, in the step for changing the pixel of the target halftone dot based on the amount of change, the change of the halftone dot is executed based on correction of slippage for either the center of the gravity in the neighboring halftone dots, or the center of the circumscribed square.

7. A computer readable medium used in a moire fringe eliminating apparatus for recording a program in a computer in order to execute the following steps, comprising:

a parameter setting step for setting initial values of various parameters used in a moire fringes eliminating process;

a feature extracting step for extracting features of all halftone dots which can be recognized;

a halftone dot similarity calculation step for calculating a similarity between a target halftone dot and features of other halftone dots;

a halftone dot feature adding step for calculating values to be added for each feature of the halftone dots in which the similarity is smaller than a predetermined threshold value;

a re-calculation step for calculating values used for determining necessity of the re-calculation based on the number of the halftone dots added in the halftone feature adding step;

a parameter changing step for changing various parameters used for eliminating the moire fringes in accordance with the values in the re-calculation;

a calculation step-for calculating an amount of change of halftone dot pixels in order to obtain the amount of change of the target halftone dot, by using an average value of added values obtained in the halftone dot feature adding step, and the feature value of the target halftone dot;

a halftone dot change deciding step for deciding necessity of change of the target halftone dot pixels based on the amount of change of the target halftone dot, and a halftone dot pixel changing step for changing the pixel of the target halftone dot based on the amount of the change.

8. A computer readable medium used in a moire fringe eliminating apparatus as claimed in claim 7, wherein the parameter changing step for changing various parameters used for eliminating the moire fringes in accordance with the re-calculation value, is executed based on at least one of the following three parameters, i.e., the number of halftone dots having similar feature and existing in the neighboring area of the target halftone dot; a center of a gravity of the neighboring halftone dots; and a dimension of slippage of a center of a circumscribed square.

9. A computer readable medium used in a moire fringe eliminating apparatus as claimed in claim 7, wherein, in the halftone dot pixel changing step for changing the pixel of the target halftone dot based on the amount of change, the change of the halftone dot is executed based on correction of slippage for either the center of the gravity in the neighboring halftone dots, or the center of the circumscribed square.

* * * * *

UNITED STATES PATENT AND TRADEMARK OFFICE
CERTIFICATE OF CORRECTION

PATENT NO. : 6,661,535 B1
DATED : December 9, 2003
INVENTOR(S) : Koichi Fujimura et al.

It is certified that error appears in the above-identified patent and that said Letters Patent is hereby corrected as shown below:

Column 14,
Line 23, change "step-for" to -- step for --.
Line 32, change "," to -- ; --.

Signed and Sealed this

Twenty-fifth Day of May, 2004

JON W. DUDAS
*Acting Director of the United States Patent and Trademark Office*